United States Patent
Xu et al.

(10) Patent No.: US 12,045,498 B2
(45) Date of Patent: Jul. 23, 2024

(54) SOLID STATE DRIVE AND WRITE OPERATION METHOD

(71) Applicant: MAXIO Technology (Hangzhou) Co., Ltd., Hangzhou (CN)

(72) Inventors: Wei Xu, Hangzhou (CN); Zihua Xiao, Hangzhou (CN); Hui Jiang, Hangzhou (CN); Zhengliang Chen, Hangzhou (CN)

(73) Assignee: MAXIO TECHNOLOGY (HANGZHOU) CO., LTD., Hangzhou (CN)

( * ) Notice: Subject to any disclaimer, the term of this patent is extended or adjusted under 35 U.S.C. 154(b) by 58 days.

(21) Appl. No.: 17/728,301

(22) Filed: Apr. 25, 2022

(65) Prior Publication Data
US 2022/0342591 A1    Oct. 27, 2022

(30) Foreign Application Priority Data

Apr. 25, 2021  (CN) .......................... 202110445653.0
Oct. 21, 2021  (CN) .......................... 202111225733.1

(51) Int. Cl.
*G06F 3/06*         (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0656; G06F 3/0658; G06F 3/061;
(Continued)

(56) References Cited

U.S. PATENT DOCUMENTS 5,974,506 A  * 10/1999  Sicola ................ G06F 12/0871
                                                    711/119
8,489,820 B1 *  7/2013  Ellard ................ G06F 12/0246
                                                    711/143
(Continued)

FOREIGN PATENT DOCUMENTS

CN        110287062 A        9/2019
CN        110413233 A       11/2019
(Continued)

OTHER PUBLICATIONS

First Office Action, including Search Report, for Chinese Patent Application No. 202111225733.1, dated Dec. 29, 2023, 16 pages.

*Primary Examiner* — Khoa D Doan
(74) *Attorney, Agent, or Firm* — Westman, Champlin & Koehler, P.A.

(57) ABSTRACT

Disclosed are a solid state drive and a write operation method. The solid state drive comprises: a controller, receiving write data from outside and comprising a first cache unit for storing the write data; a Flash memory, receiving the write data sent by the first cache unit according to a first instruction of the controller; a second cache unit, storing the write data from the first cache unit as backup data, and sending the backup data to the Flash memory according to a second instruction of the controller. The second instruction is obtained after the write data fails to be written into the Flash memory under the first instruction, so that the backup data can continue to be called if write operation fails. By combining advantages of the first and second cache units, efficiency and quality of write operations are improved and bandwidth requirements are lowered.

8 Claims, 8 Drawing Sheets

(58) Field of Classification Search
CPC ....... G06F 2212/1032; G06F 2212/214; G06F 2212/312; G06F 2212/313; G06F 2212/7203; G06F 2212/284; G06F 12/0246; G06F 12/0868; G06F 2212/6012; G06F 2212/305; G06F 2212/306; G06F 2212/3042; G06F 2212/304; G06F 2212/27; G06F 2212/283; G06F 12/0844; G06F 12/0846; G06F 12/031; G06F 12/0893–0897

See application file for complete search history.

(56) References Cited

U.S. PATENT DOCUMENTS

| | | | |
|---|---|---|---|
| 10,198,205 B1* | 2/2019 | Freilich | G06F 3/061 |
| 2005/0166086 A1* | 7/2005 | Watanabe | G06F 12/0866 |
| | | | 711/144 |
| 2013/0097369 A1* | 4/2013 | Talagala | G06F 12/0804 |
| | | | 711/103 |
| 2014/0281123 A1* | 9/2014 | Weber | G06F 11/2089 |
| | | | 711/103 |
| 2017/0123991 A1* | 5/2017 | Sela | G06F 12/0246 |
| 2018/0060162 A1* | 3/2018 | Qiang | G06F 11/1458 |
| 2019/0004949 A1* | 1/2019 | Kim | G06F 12/0246 |

FOREIGN PATENT DOCUMENTS

| | | |
|---|---|---|
| CN | 110413234 A | 11/2019 |
| WO | 2010066098 A1 | 6/2010 |

* cited by examiner

SOLID STATE DRIVE AND WRITE OPERATION METHOD

CROSS-REFERENCE TO RELATED APPLICATION

This application claims priority to Chinese patent application No. 202110445653.0, filed on Apr. 25, 2021, published as CN112947869A on Jun. 11, 2021, and entitled "SOLID STATE DRIVE AND WRITE OPERATION METHOD" and Chinese patent application No. 202111225733.1, filed on Oct. 21, 2021, published as CN113778344A on Dec. 10, 2021, and entitled "SOLID STATE DRIVE AND WRITE OPERATION METHOD", the entire contents of which are incorporated by reference in their entireties.

FIELD OF THE DISCLOSURE

The present disclosure relates to a technical field of data storage, in particular to a solid state drive and a write operation method.

DESCRIPTION OF THE RELATED ART

A Solid State Drive (SSD, Solid State Drive) is a hard disk for storage formed by a solid-state electronic memory chip and is mainly composed of a controller, a storage medium and a cache unit. At present, the most mainstream solid-state drive uses a Flash memory as the storage medium for storing data, and uses an internal SRAM (Static Random Access Memory) of the controller or an external DRAM (Dynamic Random Access Memory) as the cache.

Page is the smallest write operation unit of a Flash memory, and is different in size from a data unit corresponding to a host interface command Therefore, when an operation is executed under a host write command, write data needs to be temporarily stored in the cache, and then written into the Flash memory after integrating the write data based on the size of a unit page required by the Flash memory. Write data caching is required to support both data writing operation and data reading operation in high speed, asking for high data bandwidth requirements. Moreover, since the write operation performed on the Flash memory has a certain probability of failure, in order to ensure that the data is not lost, the write data needs to be kept in the cache until the write operation on the Flash memory is successful. However, it takes a long time to perform write operation on the Flash memory, so that a cache with larger size is required.

At present, for the solid state drive, when an SRAM is used as the cache, although the SRAM can provide a high data read and write bandwidth, it is difficult to provide a large capacity due to high cost of the SRAM. Therefore, in general, part of a cache space of the SRAM needs to be released before completing a write operation with a large amount of data. If the write operation fails, data in the cache space that has been released is lost. When a DRAM is used as the cache, although it can provide a larger capacity, it is difficult to meet high bandwidth requirements of the controller due to low read and write bandwidth of the DRAM, at the same time, technologies to improve the read and write bandwidth of the DRAM is complicated, greatly increasing manufacturing cost of the solid state drive. Therefore, none of the current cache solutions of the solid state drive can complete data write operation efficiently with high quality.

SUMMARY OF THE DISCLOSURE

In view of the above problems, an objective of the present disclosure is to provide a solid state drive and a write operation method for the solid state drive, so as to solve the problems existing in the prior art.

According to an aspect of the present disclosure, there is provided a solid state drive, comprising:

a controller, which is coupled with a host, configured to receive write data from outside, and comprises a first cache unit for storing the write data;

a Flash memory, which is coupled to the controller and configured to receive the write data sent by the first cache unit according to a first instruction of the controller;

a second cache unit, which is coupled to the controller, configured to receive and store the write data from the first cache unit as backup data and send the backup data to the Flash memory according to a second instruction of the controller, wherein the second instruction is obtained after the write data fails to be written into the Flash memory under the first instruction.

Optionally, the controller comprises:

a central processing unit, which is coupled with the first cache unit and configured to control storing and releasing operations of the write data in the first cache unit;

an interface unit, which is coupled with the central processing unit and the host and configured to receive the write data and realize data transmission;

a Flash controller, which is coupled with the central processing unit and the Flash memory and configured to control writing operation of the write data into the Flash memory; and a cache controller, which is coupled with the central processing unit and the second cache unit and configured to realize storing and releasing operations of the write data in the second cache unit according to a control of the central processing unit.

Optionally, the first cache unit is a static random access memory, and the second cache unit is a dynamic random access memory.

Optionally, the central processing unit is configured to: control the first cache unit to store the write data, and transmit the first instruction to the first cache unit and the Flash controller; and release a cache space of the first cache unit after a transmission of the write data to the Flash memory under the first instruction is completed.

Optionally, after the write data fails to be written into the Flash memory under the first instruction, the central processing unit is configured to transmit the second instruction to the cache controller and the Flash controller.

According to another aspect of the present disclosure, there is provided a write operation method for a solid state drive comprising a controller, a Flash memory and a second cache unit, wherein the controller comprises a first cache unit, and the controller performs following operations:

receiving write data from a host and storing the write data in the first cache unit;

reading the write data from the first cache unit, backing up the write data to the second cache unit, and sending the write data to the Flash memory; and after receiving a feedback indicating that the write data fails to be written into the Flash memory, repeating the step of reading the write data from the second cache unit and sending the write data to the Flash memory until a feedback indicating that the write data is successfully written to the cache memory is received; and releasing a cache space occupied by the write data in the second cache unit.

Optionally, after the step of reading the write data from the first cache unit, backing up the write data to the second cache unit, and sending the write data to the Flash memory, the write operation method further comprises:

releasing a cache space occupied by the write data in the first cache unit after a transmission of the write data is completed.

Optionally, the step of reading the write data from the first cache unit, backing up the write data to the second cache unit, and sending the write data to the Flash memory comprises:

backing up the write data from the first cache unit to the second cache unit; and reading the write data in the first cache unit and sending the write data to the Flash memory.

Optionally, the step of reading the write data from the first cache unit, backing up the write data to the second cache unit, and sending the write data to the Flash memory comprises:

reading the write data from the first cache unit and storing the write data to the second cache unit, and sending the write data to the Flash memory simultaneously.

According to another aspect of the present disclosure, there is also provided a write operation method for a solid state drive comprising a controller, a Flash memory and a second cache unit, wherein the controller comprises a first cache unit, and the controller performs following operations:

receiving write data from a host;

storing the write data in the first cache unit and the second cache unit simultaneously;

reading the write data in the first cache unit and sending the write data to the Flash memory;

releasing a cache space occupied by the write data in the first cache after a transmission of the write data is completed;

after receiving a feedback indicating that the write data fails to be written into the Flash memory, repeating the step of reading the write data from the second cache unit and sending the write data to the Flash memory until a feedback indicating that the write data is successfully written to the cache memory is received; and releasing a cache space occupied by the write data in the second cache unit.

Optionally, receiving the feedback indicating that the write data fails to be written into the Flash memory comprises: receiving a write failure status signal fed back in the Flash memory.

Optionally, receiving the feedback indicating that the write data fails to be written into the Flash memory comprises: detecting that the write data in the Flash memory does not completely match the write data of the host.

According to the solid state drive and its write operation method provided by the present disclosure, the write data of the host is stored in the first cache unit, and before or at the time of transmitting the write data to the Flash memory by the first cache unit, the write data is backed up from the first cache unit to the external second cache unit with a large capacity, so that when the operation to write data from the first cache unit to the Flash memory fails, the backup data of the second cache unit can continue to be called. By combining the advantages of both the first cache unit and the second cache unit, the efficiency and quality of write operations are improved, the capacity of the first cache unit is saved, and the bandwidth requirements of the second cache unit are reduced. After the first cache unit receives the write data from the host, it backs the write data up to the second cache unit, and completes the operation of storing the write data in the Flash memory, so that the backup and write operations of the entire write data are independent completed within the solid state drive, which simplifies a hardware design between the host and the solid state drive and reduces costs.

Further, the first cache unit is released immediately after the transmission of the write data from the first cache unit to the Flash memory is completed, and does not need to be released until the write operation is successfully written, so as to speed up the releasing, recycling and reusing operations of the first cache unit. Therefore, the effect of ensuring smoothness of large-bandwidth write operations by using a small-capacity cache unit is realized, and an increase in costs caused by the need for capacity expansion for the data backlog in the first cache unit is avoided.

BRIEF DESCRIPTION OF THE DRAWINGS

The above and other objects, features and advantages of the present invention will become more apparent from following descriptions of embodiments of the present disclosure with reference to the accompanying drawings, in which:

FIG. 3b shows a schematic block diagram of a solid state drive in the first embodiment for performing the write operation method of FIG. 3a;

FIG. 4b shows a schematic block diagram of a solid state drive in the second embodiment for performing the write operation method of FIG. 4a;

FIG. 5b shows a schematic block diagram of a solid state drive in the third embodiment for performing the write operation method of FIG. 5a.

DETAILED DESCRIPTION OF EMBODIMENTS OF THE DISCLOSURE

Figure 1:
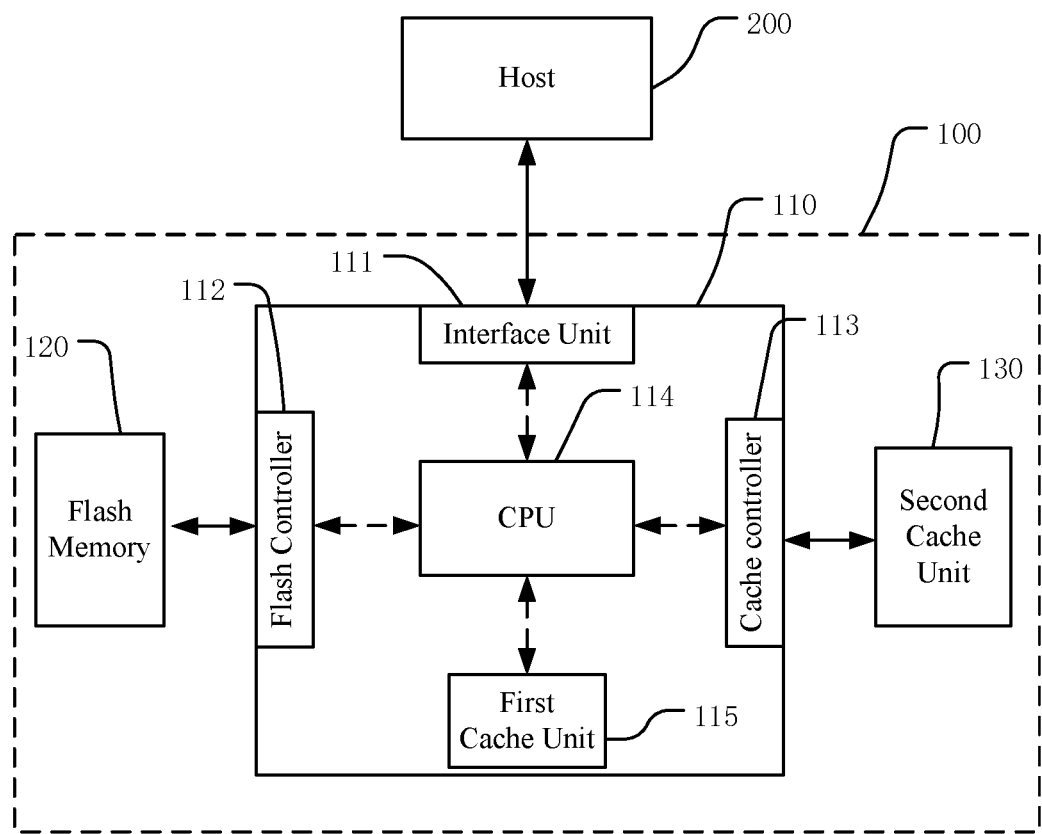
FIG. 1 shows a simple structural block diagram of a solid state drive according to an embodiment of the present disclosure.

The present invention will be described in more detail below with reference to the accompanying drawings. In the various figures, same elements are denoted by similar reference numerals. For the sake of clarity, the various parts in the figures are not drawn to scale. Additionally, some well-known parts may not be shown.

The present invention is described below based on embodiments, but the present invention is not limited to these embodiments only. In the following detailed description of the present disclosure, some specific details are described in detail. The present disclosure may also be fully understood by those skilled in the art without a detailed description of these details. Well-known methods, procedures, processes, elements and circuits have not been described in detail in order to avoid obscuring the essence of the present disclosure.

Unless the context clearly requires otherwise, throughout the specification and claims, words such as "comprising", "including" should be construed in an inclusive way rather than in an exclusive or exhaustive sense; that is, construed as the meaning of "comprising but not limited to". In the description of the present disclosure, it should be understood that the terms "first", "second" and the like are used for descriptive purposes only, and should not be construed as indicating or implying relative importance. Also, in the description of the present invention, unless otherwise specified, "a plurality of" means two or more.

The specific implementation of the disclosure will be further described in detail in combination with drawings and the embodiment.

FIG. 1 shows a simple structural block diagram of a solid state drive according to an embodiment of the present disclosure.

A solid state drive is a storage hard disk formed by a solid-state electronic memory chip, and the solid state drive 100 in the present embodiment comprises: a controller 110, a storage medium and a second cache unit 130. A Flash memory 120 is used as a storage medium for storing data, at the same time, a first cache unit 115 arranged inside the controller 110 and the second cache unit 130 arranged outside the controller 110 are used as the cache units. The controller 110 is responsible for data management on the storage medium, and serves as a data transfer module to connect a host 200 and the Flash memory 120; the cache units are used to assist the controller 110 in data processing. As shown in FIG. 1, the controller 110 is coupled to the host 200 and configured to receive write data from outside, the controller 110 comprises the first cache unit 115 for storing the write data; the Flash memory 120 is coupled to the controller 110 and used for receiving the write data sent by the first cache unit 115 according to a first instruction of the controller 110; a second cache unit 130 is coupled to the controller 110 and used for storing the write data from the first cache unit 115 as backup data, and according to a second instruction of the controller 110, sending the backup data to the Flash memory 120, wherein the second instruction is obtained in a case that the write data fails to be written into the Flash memory 120 under the first instruction.

Further, the controller 110 comprises: an interface unit 111, a Flash controller 112, a cache controller 113, a central processing unit 114 and the first cache unit 115. The interface unit 111 connects the external host 200 and the central processing unit 114 to realize data transmission, such as transmitting the write data of the host 200 to the controller 110. A common interface unit 111 comprises an SATA, a PCIe, etc. The central processing unit 114 is, for example, a CPU, for controlling operations of each component in the solid state drive 100, for example, connecting with the first cache unit 115 to control storing and releasing operations of the write data in the first cache unit 115, so that the write data can be stored in the first cache unit 115. The Flash controller 112 is connected to the central processing unit 114 and the Flash memory 120, and is configured to write the write data into the Flash memory 120 according to the control of the central processing unit 114. The cache controller 113 is connected to the central processing unit 114 and the second cache unit 130, and according to the control of the central processing unit 114, backs up the write data in the first cache unit 115 to the second cache unit 130 to become backup data, or releases the data in the second cache unit 130.

The minimum write operation unit of the Flash memory 120 is a page, and a data unit of an interface command of the host 200 is a sector. The two are different. Therefore, when a write command operation of the host 200 is executed, the write data cannot be directly written into the Flash memory 120, but is temporarily stored in a write data cache which is a cache unit. The write data in the cache unit is integrated into the size of the unit page required by the Flash memory 120, and then written into the Flash memory 120. When the solid state drive 100 executes write command processing, the cache unit is required to support both data writing and reading operations with high speed. For example, for a solid state drive with a PCIe Gen3×4 host interface, to support 3 GB/s data write performance, the cache unit needs a 6 GB/s data read and write bandwidth. Moreover, in order to ensure that the data is not lost, the write data needs to be kept in the cache unit until the write operation of the Flash memory is successful. However, the write operation of the Flash memory 120 takes very long time. In order to ensure continuous write performance of the solid state drive 100, the cache unit is required to provide a relatively large capacity. In this embodiment, both the first cache unit 115 inside the controller 110 and the second cache unit 130 outside the controller 110 are used as the cache units, wherein a high-speed DRAM (Dynamic Random Access Memory) is used as the second cache unit 130, and an SRAM (Static Random Access Memory) is used as the first cache unit 115, and the write data is cached on the SRAM and the DRAM simultaneously, so that the high bandwidth of the SRAM and the high capacity of the DRAM can be utilized at the same time.

Specifically, the controller 110 is connected to the host 200, receives the write data of the host 200 through the interface unit 111, realizes data transmission, executes the write command operation of the host 200, and stores the write data. At this time, the central processing unit 114 controls the first cache unit 115 to store the write data, and transmits a first instruction to the first cache unit 115 and the Flash controller 112, wherein the first instruction indicates that the write data in the first cache unit 115 is required to to be transmitted to the Flash memory 120. The Flash memory 120 and the controller 110 are connected, and the write data in the first cache unit 115 is read according to the first instruction of the central processing unit 114 and stored in the Flash memory 120. The second cache unit 130 is connected with the cache controller 113 in the controller 110, and the cache controller 113 is connected to the central processing unit 114, and the storing and releasing operations of the write data in the second cache unit 130 can be realized according to the control of the central processing unit 114. Before or at the time of sending the write data in the first cache unit 115 to the Flash memory 120, the central controller 114 controls the cache controller 113 to store the write data in the first cache unit 115 into the second cache unit 130 as the backup data. At this time, the write data is stored in the first cache unit 115 and the second cache unit 130. After the central processing unit 114 finishes transmitting the write data to the Flash memory 120, it releases the cache space of the first cache unit 115. If it is detected that the Flash memory 120 successfully stores the write data, it releases the cache space of the second cache unit 130. And if the operation to write into the Flash memory 120 under the first instruction fails, the central processing unit 114 sends the second instruction to the cache controller 113 and the Flash controller 112, wherein the second instruction indicates that the write data in the second cache unit 130 needs to be transmitted to the Flash memory 120. The second cache unit 130 is configured to send the backup data to the Flash memory 120 according to the second instruction of the controller 110, the cache space of the second cache unit 130 is released only when the Flash memory 120 stores the write data successfully.

Further, when the host 200 transmits the write data to the solid state drive 100, the controller 110 may also store the write data in the first cache unit 115 and the second cache unit 130 simultaneously. The present disclosure takes into account that design complexity may be increased while caching the write data into the two cache units simultaneously. Therefore, in the foregoing embodiment, a solution, in which the controller 110 first caches the write data into the first cache unit 115, and then backs up the write data to the second cache unit 130 from the first cache unit 115, is employed.

Since the solid state drive 100 in this embodiment of the present disclosure is configured to store the write data in the first cache unit 115, and back up the write data into the second cache unit 130 before or at the time of transmitting the write data to the Flash memory 120 as the backup data by the first cache unit 115. Thus, when the write data is transmitted to the Flash memory 120, data is only read from the SRAM serving as the first cache unit 115, taking requirements on both of cache space and bandwidth of the SRAM into account. The write data is backed up to the second cache unit 130, so that when the operation to write into the Flash memory 120 fails, the write data is still backed up in the DRAM, and the controller 110 can still initiate a new write operation of the Flash memory 120, and the backup data in the DRAM is sent to the Flash memory 120 without losing the write data, which ensures the security and success rate of the data transmission. After the write operation of the Flash memory 120 is successful, the controller 110 of the solid state drive 100 deletes the backup data on the DRAM, and releases the DRAM cache space occupied by the backup data. Then, because data reading and writing operations are mainly relied on the SRAM, in most cases, the DRAM is only used for writing data backup, that is, only performing the write operation of the write data, and only when the operation responsing to a writing command on the Flash memory 120 fails, will the backup data be read from the DRAM, so most of the time the DRAM only writes data, and does not need to read data. Through this mixed SRAM and DRAM write data cache management mechanism, DRAM bandwidth requirements can be lowered by half. Therefore, advantages of the SRAM and the DRAM are both taken into account and complement with each other, which ensures a success rate and reliability of data transmission, lowers bandwidth requirements, and reduces costs.

And after the write data is transmitted to the Flash memory 120, the SRAM cache space occupied by the write data is immediately released without waiting for the write data to be successfully written to the Flash memory 120, so that the SRAM cache space can be released in time. The SRAM cache has a fast speed and a small capacity. Only by accelerating the releasing and recycling operations of the SRAM cache can it be realized that a SRAM with low capacity is enough for ensuring smoothness of a large bandwidth write operation. If the write data cached in the SRAM is released after the write operation of the Flash memory 120 is successful, it will take a lot of time (usually hundreds of microseconds to several milliseconds), and the data cached in the SRAM will not be released quickly, resulting in a backlog. Therefore, a relatively large capacity in the SRAM is occupied, which increases the cost of a main control chip. Timely releasing operation of the SRAM can not only ensure that data can be timely written and read, but also requirements on chips and costs can be lowered.

Moreover, when the controller 110 simultaneously stores the write data in the first cache unit 115 and backs it up to the second cache unit 130, in order to ensure pacing consistency and accuracy of the data transmission, it is necessary to add design complexity at an interface between the solid state drive 100 to the host 200. However, after the first cache unit 115 backs up the write data to the second cache unit 130, and when transmitting the write data from the first cache unit 115 to the Flash memory 120, the pacing consistency of the data transmission is not necessary to be considered, which reduces design costs and complexity. In addition, the first cache unit 115 backs up the write data to the second cache unit 130, so that after the host 200 transmits the write data to the controller 110, all transmission operations of the write data can be independently completed in the solid state drive 100, which reduces data entanglement with the host 200 and increases independence.

Figure 2:
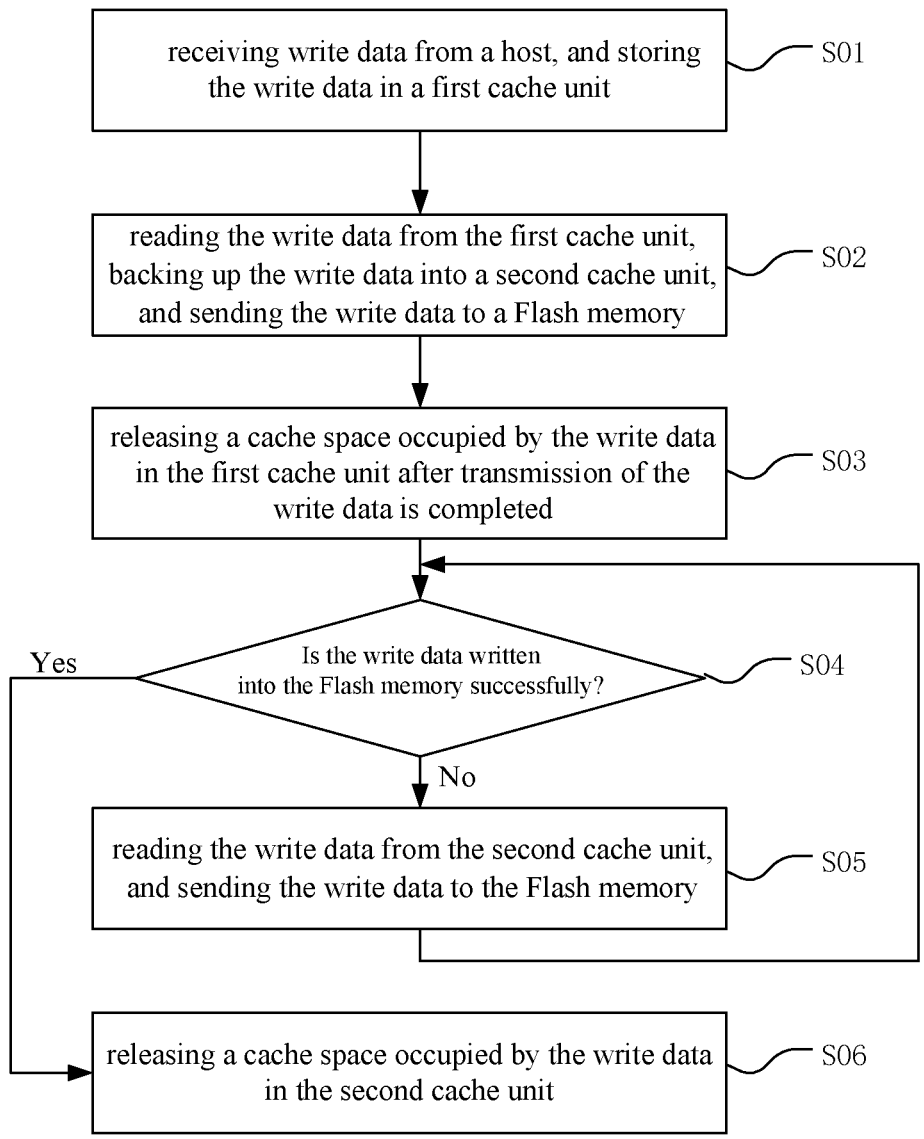
FIG. 2 shows a simple flowchart of a write operation method for a solid state drive according to an embodiment of the present disclosure.

Also provided in the present invention is a write operation method of the solid state drive 100, which will be specifically described with reference to FIG. 2. FIG. 2 shows a simple flowchart of a write operation method for a solid state drive according to an embodiment of the present invention.

With reference to FIGS. 1 to 2, the write operation method for the solid state drive 100 in this embodiment is performed by the controller 110, and specifically comprises performing the following operations:

Step S01, receiving the write data from the host 200 and storing the write data in the first cache unit 115 inside the controller 110;

Step S02, reading the write data from the first cache unit 115, backing up the write data into the second cache unit 130, and sending the write data to the Flash memory 120 according to the first instruction;

Step S03, releasing the cache space occupied by the write data in the first cache unit 115 after the transmission of the write data is completed;

Step S04, judging whether the data is written in the Flash memory 120 successfully, and executing step S06 if the data is written in the Flash memory 120 successfully, otherwise, executing step S05;

Step S05, after receiving a feedback indicating that the write data fails to be written into the Flash memory 120, repeating the step of reading the write data from the second cache unit 130 according to the second instruction and sending the write data to the Flash memory 120 until a feedback indicating that the write data is successfully written to the cache memory 120 is received, wherein the step of receiving the feedback indicating that the write data fails to be written into the Flash memory 120 comprises: receiving a write failure status signal fed back in the Flash memory 120.

Step S06, releasing the cache space occupied by the write data in the second cache unit 130.

The solid state drive and the write operation method thereof under different embodiments are respectively described below according to FIG. 3a-FIG. 5b.

Figure 3A:
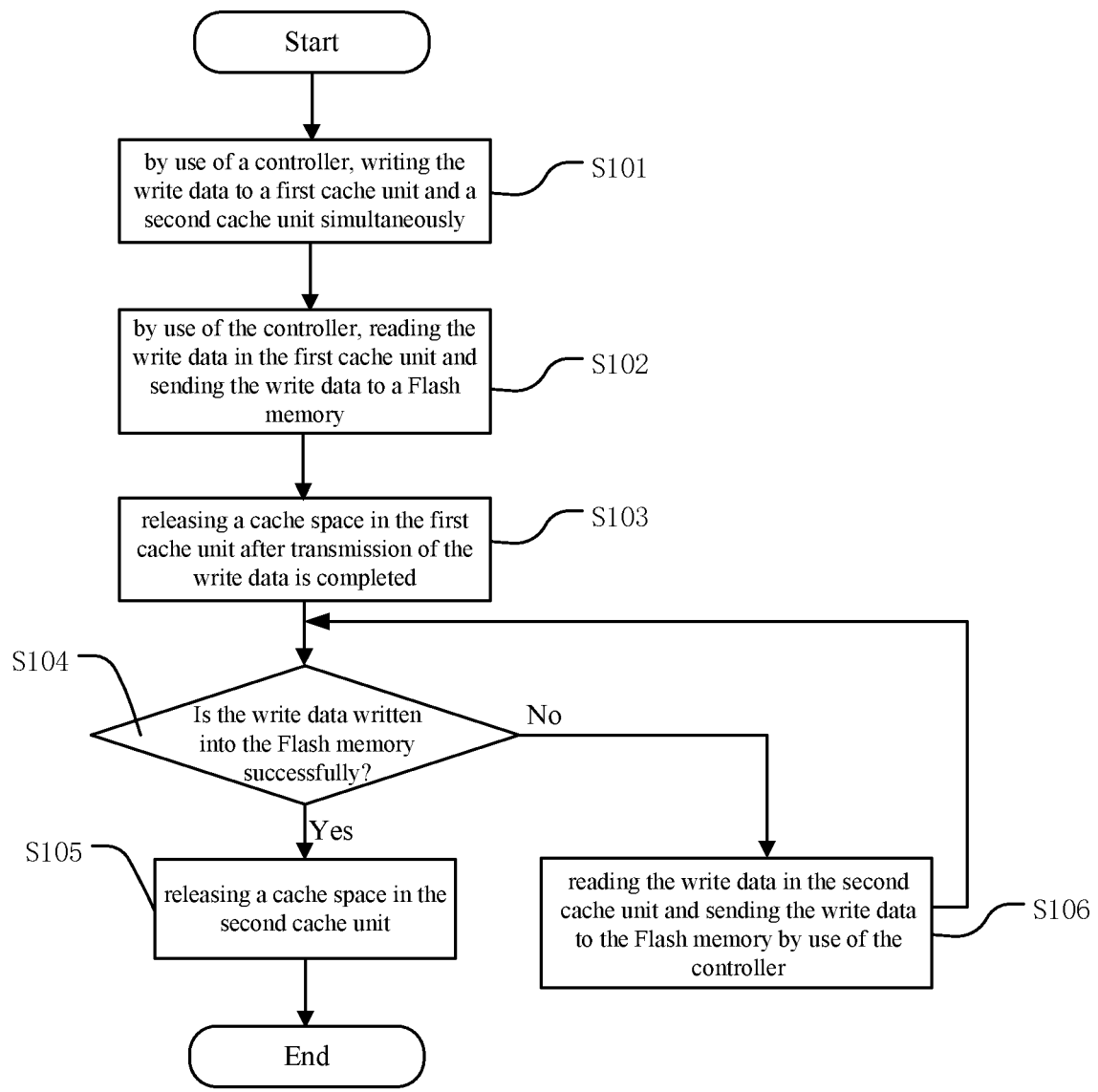
FIG. 3a shows a specific flowchart of a write operation method for a solid state drive according to a first embodiment of the present disclosure.
Figure 3B:
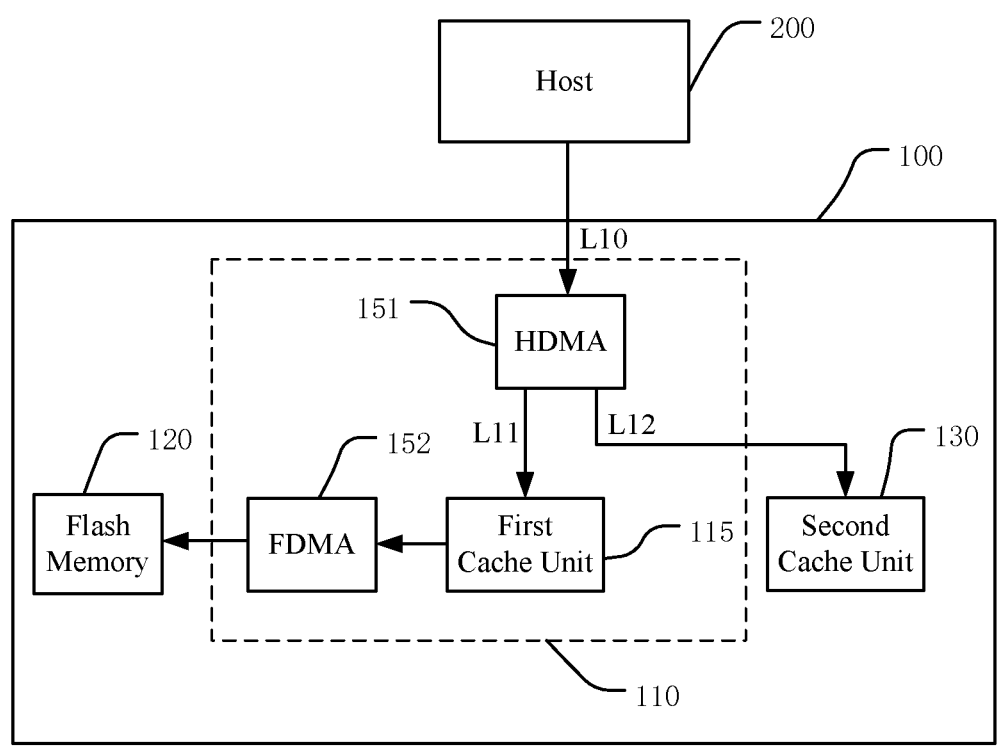

FIG. 3a shows a specific flow chart of a write operation method of a solid state drive according to the first embodiment of the present disclosure; and FIG. 3b shows a schematic block diagram of a solid state drive in the first embodiment for executing the write operation method of FIG. 3a.

As shown in FIGS. 3a and 3b, the write operation method of the first embodiment of the present disclosure actually writes the write data into the SRAM and the DRAM simultaneously when the controller 110 of the solid state drive 100 obtains the write data from the host 200.

Referring to FIG. 3a, in step S101, the controller writes the write data into the first cache unit and the second cache unit simultaneously. In this step, the controller 110 receives the write data from the host 200, and on the one hand, the central processing unit 114 controls the write data to be stored in the first cache unit 115, and on the other hand, the central processing unit 114 controls the cache controller 113 to store the write data in the second cache unit 130 as backup data. "Simultaneously" herein is not meant to indicate exact time, but to indicate that before the central processing unit 114 executes the first instruction, the write data is stored in both of the DRAM and the SRAM.

In step S102, the write data in the first cache unit is read and sent to the Flash memory by the controller. In this step, the central processing unit 114 is configured to send the first instruction to the first cache unit 115 and the Flash controller 112, to send the write data in the first cache unit 115 to the Flash memory 120.

In step S103, the cache space occupied by the first cache unit is released after the transmission of the write data is completed. In this step, the write data is stored into the Flash memory 120, indicating that the transmission is completed. At this time, the cache space occupied by the write data in the first cache unit 115 is released, so as to prevent data pressure of the SRAM from being too high and the storage space from being in short supply.

In step S104, whether the data is written in the Flash memory successfully is judged. In this step, for example, the write data in the Flash memory 120 is compared with the write data transmitted by the host 200. If these two data are consistent, meaning that the write operation of the Flash memory 120 is successfully executed, step S105 is executed. If the write data in the Flash memory 120 does not completely match the write data of the host 200, meaning that the storing operation fails (that is, the write operation fails to be executed), then step S106 is executed. Or in this step, for example, the Flash memory 120 returns the data write failure status signal to the controller 110 through the Flash controller 112, that is, the Flash memory 120 feeds back the write failure status signal, meaning that the storing operation fails (that is, the write operation fails to be executed), then step S106 is executed.

In step S105, the cache space of the second cache unit is released. In S104, if it is judged that the writing operation to the Flash memory 120 is successful and the data transmission is completed, then this step is executed to release the cache space of the DRAM.

In step S106, the write data in the second cache unit is read and sent to the Flash memory by the controller. If it is judged that the write operation on the Flash memory 120 fails, at this time, the SRAM cache space has already been released, and the backup data still exists in the DRAM, then, the write data is re-sent to the Flash memory 120, the data at this time comes from the backup data in the second cache unit 130.

Steps S104-S106 are executed cyclically, after the write data in the Flash memory 120 is successfully stored, the cache unit of the DRAM can be released.

As shown in FIG. 3b, in the write operation method of FIG. 3a, a DMA (Direct Memory Access) is designed at the interface between the solid state drive 100 and the host 200 to transport data, thereby reducing pressure on the central processing unit 114. Specifically, after receiving the write data from the host 200, the solid state drive 100 is configured to write respectively the data into the first cache unit (SRAM) 115 and the second cache unit (DRAM) 130 through an HDMA (Host Direct Memory Access) (that is, a first transport unit 151) located inside the controller 110 simultaneously, and then the first cache unit 115 transmits the write data to the Flash memory 120. The first transport unit (HDMA) 151 is, for example, located in the interface unit 111 inside the controller 110, and is an internal structure of the solid state drive 110.

The first transport unit (HDMA) 151 receives the write data from the host 200 through one input channel L10, and then transmits the write data to the first cache unit 115 and the second cache unit 130 through two output channels L11 and L12, respectively. The processing data of the two output channels must be synchronized. If they are not synchronized, a speed of receiving the write data of the host 200 will be reduced. For example, the two output channels will transmit a first batch of data to the two cache units simultaneously before starting a transmission of the next batch of data. Since the DRAM cannot write data during a period of self-refresh, in order to synchronize the data processing of the two output channels, a cache is generally set on the second channel L12 to balance the inconsistency of writing data to the SRAM and writing data to the DRAM, this will increase design complexity to a certain extent, so this embodiment is suitable for a scenario where design complexity can be easily increased at the host interface.

Further, the controller 110 further comprises a second transport unit 152, i.e., FDMA (Flash Direct Memory Access), and the second transport unit 152 transmits the write data of the first cache unit 115 to the Flash memory 120, and the second transport unit 152 is, for example, located inside the Flash controller 112. Both the HDMA and FDMA are hardware designs inside the solid state drive 110. The solid state drive of this embodiment uses the HDMA and FDMA to transmit data, which can reduce data processing pressure on the central processing unit 114, and at the same time, the internal hardware structure are used to avoid adding a redundant hardware device for the solid state drive 100.

Figure 4A:
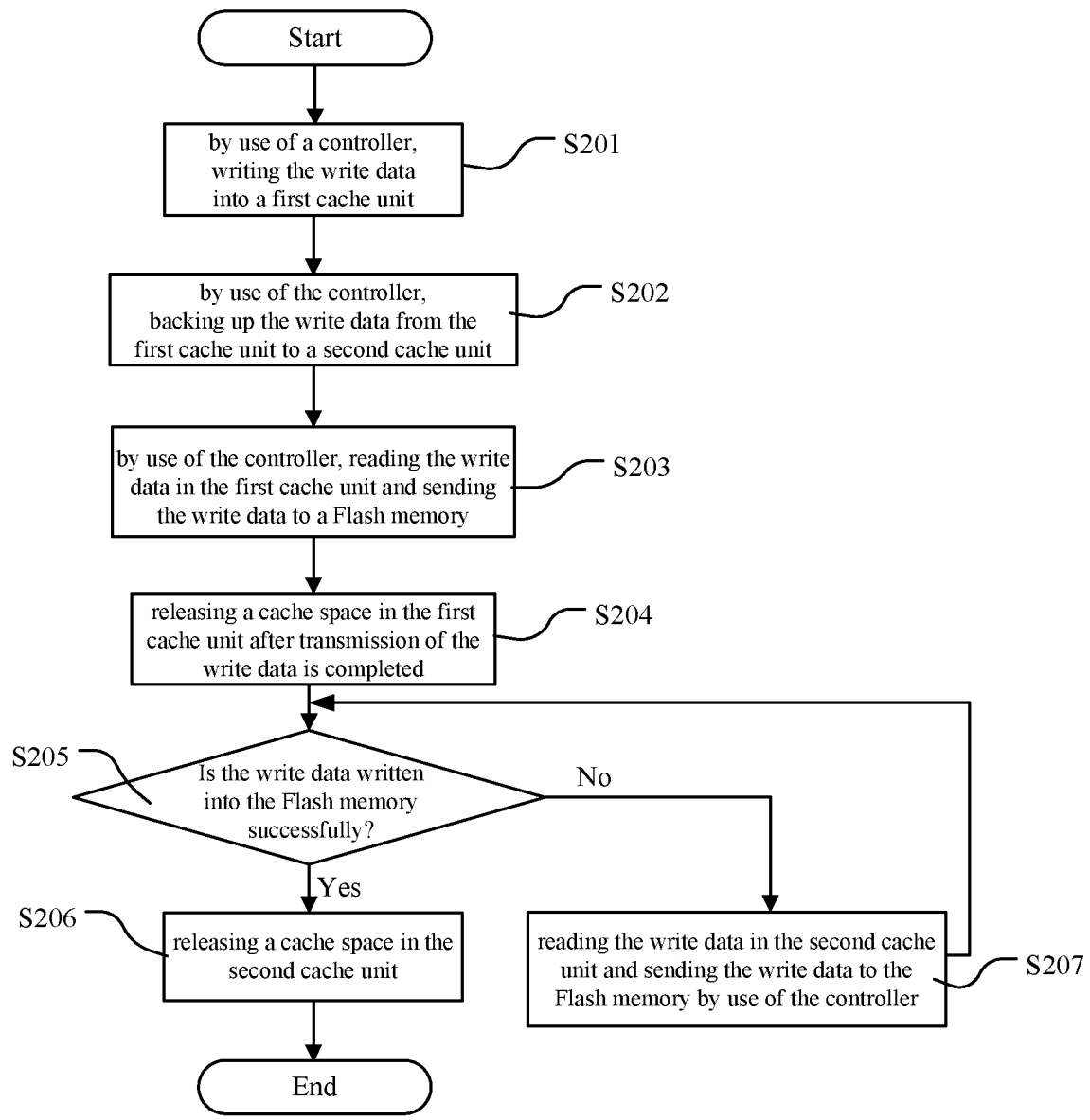
FIG. 4a shows a specific flowchart of a write operation method for a solid state drive according to a second embodiment of the present disclosure.
Figure 4B:
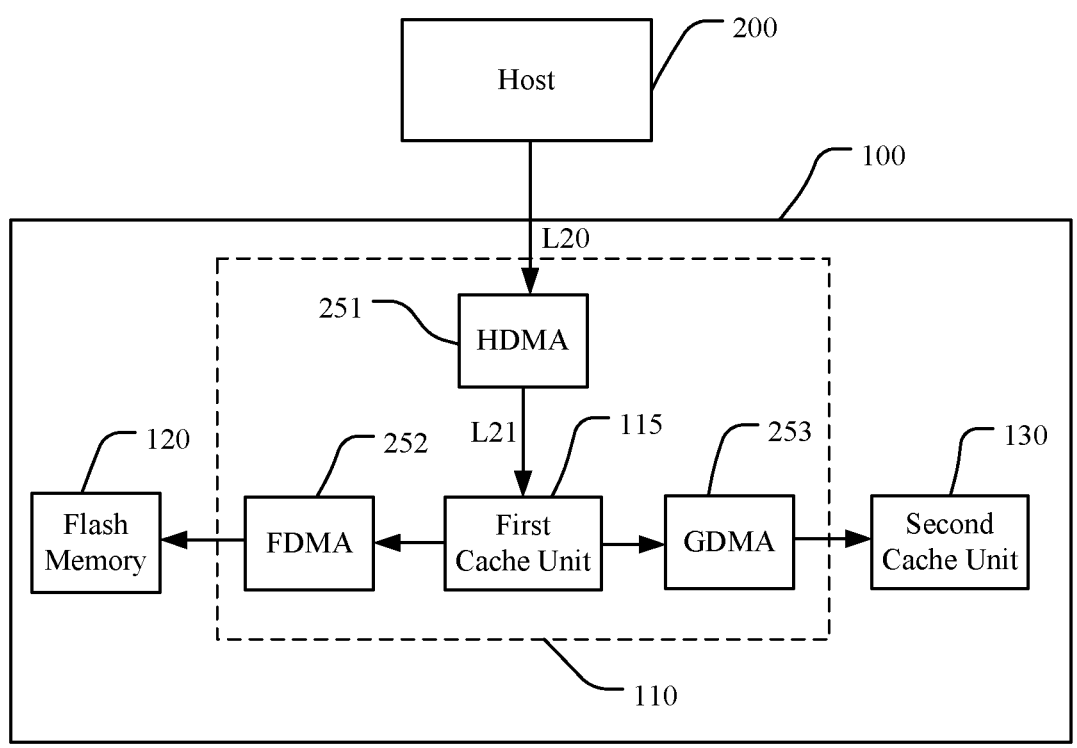

FIG. 4a shows a specific flow chart of a write operation method of a solid state drive according to a second embodiment of the present disclosure; and FIG. 4b shows a schematic block diagram of a solid state drive in the second embodiment for executing the write operation method of FIG. 4a.

As shown in FIG. 4a, the write operation method of the solid state drive provided in this embodiment is substantially the same as that of the first embodiment. The difference is that, in this embodiment, the write data of the host 200 is first stored in the first cache unit 115; and then the write data in the first cache unit 115 is backed up to the second cache unit 130. That is, the data in the DRAM comes from the SRAM, and the data in the DRAM and SRAM are stored separately. In this embodiment, when the controller 110 of the solid state drive 100 acquires the write data from the host 200, the write data is first written into the SRAM, and before the write command operation of the Flash memory 120 is performed, the write data is read out from the SRAM and backed up in the DRAM. Steps S203-S207 in this embodiment are exactly the same as steps S102-S106 in the first embodiment, and will not be repeated here.

In this embodiment, in step S201, the controller writes the write data into the first cache unit. The central processing unit 114 of the controller 110 controls to store the write data of the host 200 only in the first cache unit 115.

In step S202, the controller backs up the write data from the first cache unit to the second cache unit. Before sending the write data to the Flash memory 120, the central processing unit 114 controls the write data in the first cache unit 115 to be backed up into the second cache unit 130 to complete the write data backup.

Steps S203-S207 are then executed.

As shown in FIG. 4b, this embodiment is more convenient to be designed and implemented than the first embodiment, because in this embodiment, the write data is first stored in the first cache unit 115, and then the first cache unit 115 transmits the write data to the second cache unit 130, data transmission consistency is not required to be considered, so that there is no need to adjust the consistency of the data transmission by the first transport unit 251 at the interface between the solid state drive 100 and the host 200. In the second embodiment shown in FIG. 4b, the first transport unit 251 (HDMA) receives the write data of the host 200 through an input channel L20, and then transmits the write data to the first cache unit 115 through an single output channel L21. The first transport unit 251 is the same as the first transport unit 151 in the embodiment of FIG. 3b, except that one output channel is removed. In addition, in this embodiment, a third transport unit 253 is also required, that is, GDMA (General Direct Memory Access), to transport the write data from the first cache unit 115 (SRAM) to the second cache unit 130 (DRAM), and the GDMA is a general-purpose DMA, and usually the controller 110 with the DRAM has such a general-purpose DMA. Then, the write data of the host 200 is first received by the controller 110, stored in the first cache unit 115 via the first transport unit 251, then the third transport unit 253 backs up the write data in the first cache unit 115 to the second cache unit 130, and then the second transport unit 252 transmits the write data in the first cache unit 115 to the Flash memory 120. The second transport unit 252 is the FDMA, which is the same as the second transport unit 152 in the embodiment of FIG. 3b.

In this embodiment, since the transmission of the write data is completely performed serially (the write data is transmitted from the host 200 to the first cache unit 115, then transmitted from the first cache unit to the second cache unit 130, and then transmitted by the first cache unit 115 to the Flash memory 120), there is no need to consider pacing consistency of data transmission, and there is no need to modify design complexity at the interface of the host 200 and the interface of the Flash memory 120. It only needs to make use of a plurality of self-contained DMAs in the solid state drive 100 for achieving the purpose of backing up write data. Compared with the first embodiment, this embodiment has a simpler design and lower cost, and the transmission of the written data is relatively independent, and the transmission pressure of the CPU is reduced. Therefore, the solid state drive and the write operation method of this embodiment are applicable to a scenario where a hardware design of a main control chip cannot be modified, and only software can be developed to realize the write data backup.

Figure 5A:
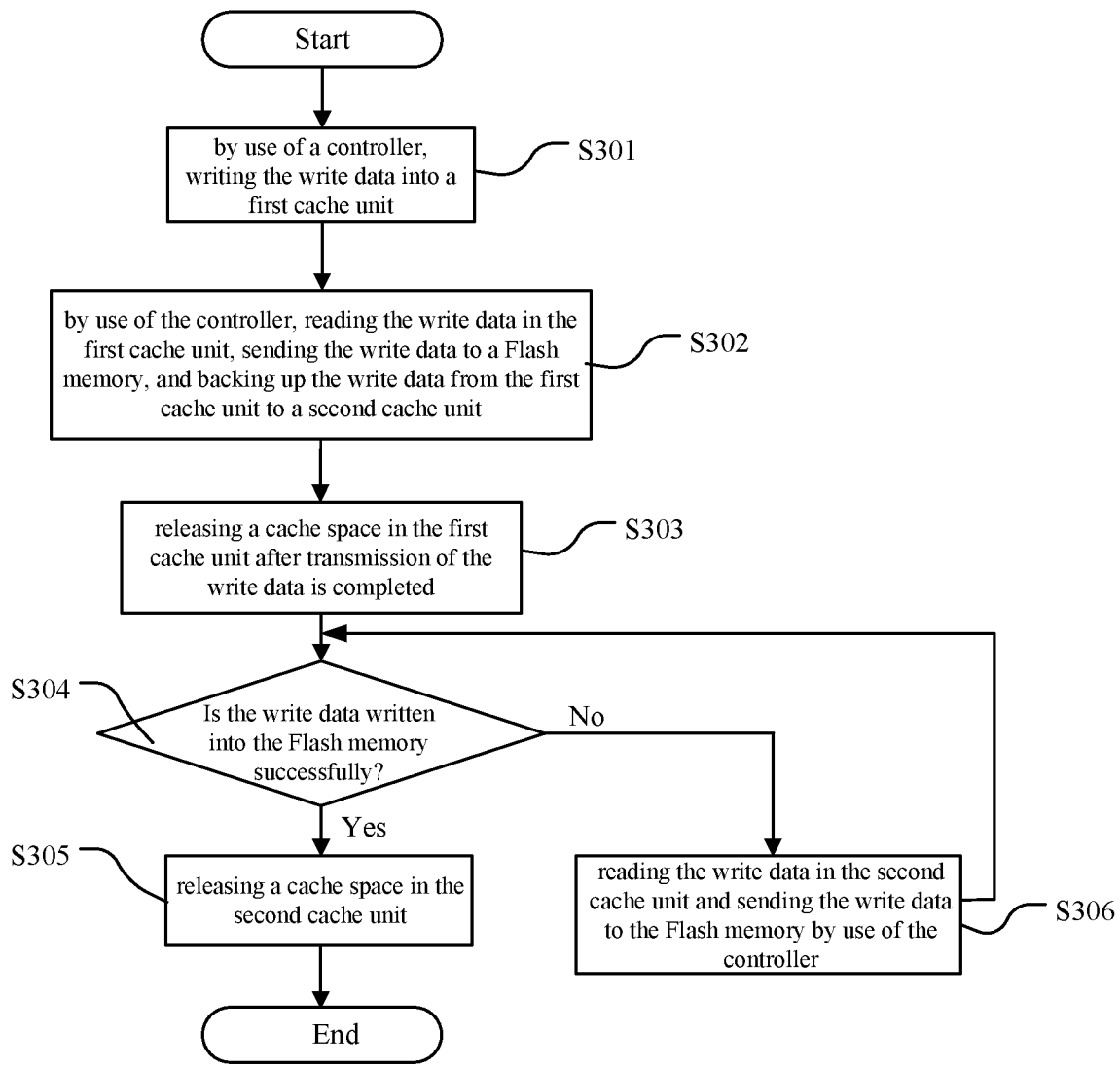
FIG. 5a shows a specific flowchart of a write operation method for a solid state drive according to a third embodiment of the present disclosure.
Figure 5B:
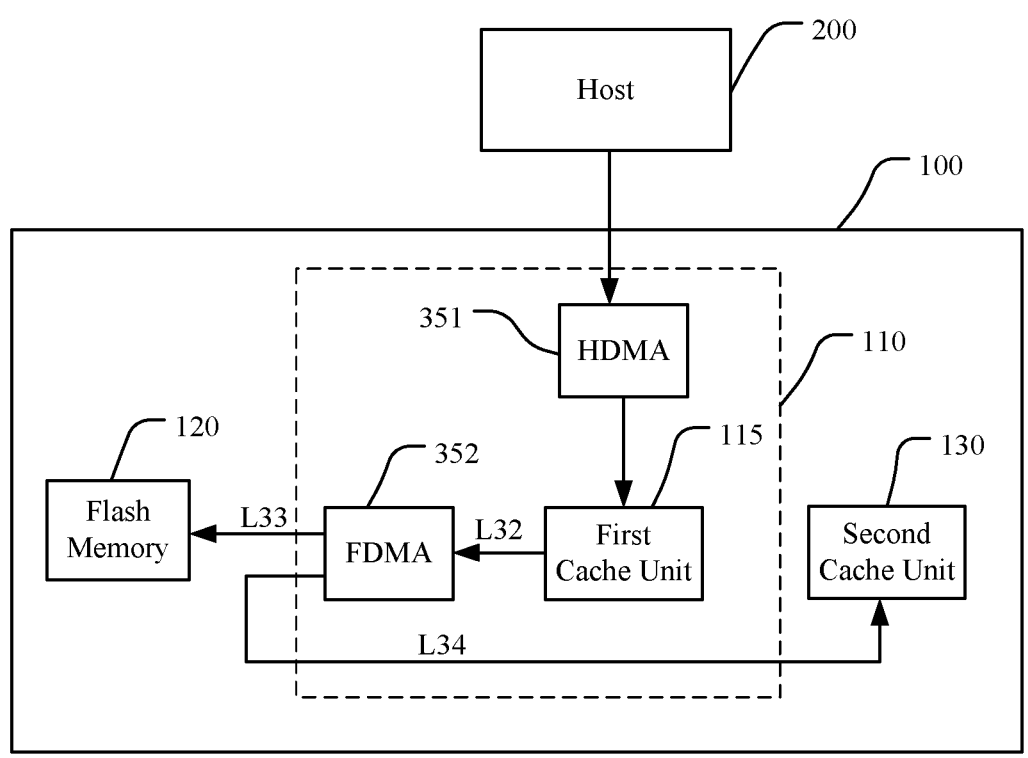

FIG. 5a shows a specific flow chart of a write operation method of a solid state drive according to a third embodiment of the present disclosure; and FIG. 5b shows a schematic block diagram of a solid state drive in the third embodiment for executing the write operation method of FIG. 5a.

As shown in FIG. 5a, the write operation method for the solid state drive 100 provided in this embodiment comprises: receiving write data from the host 200; storing the write data in the first cache unit 115; reading the write data from the first cache unit 115, storing the write data in the second cache unit 130, and sending the write data to the Flash memory 120 simultaneously; releasing the cache space occupied by the write data in the first cache unit 115 after the transmission of the write data is completed; after receiving a feedback indicating that the write data fails to be written into the Flash memory 120, repeating the step of reading the writing data from the second cache unit 130 and sending the write data to the Flash memory 120 until a feedback indicating that the write data is successfully written to the Flash memory 120 is received; and releasing the cache space occupied by the write data in the second cache unit 130. Among them, the step of receiving the feedback indicating that the write data fails to be written into the Flash memory 120 comprises: receiving a write failure status signal fed back in the Flash memory 120, or detecting that the write data in the Flash memory 120 does not completely match the write data of the host 200.

The difference between this embodiment and the above two embodiments is that in the above two embodiments, the write data is backed up in the DRAM before the first cache unit 115 sends the write data to the Flash memory 120, while in the present embodiment, the first cache unit 115 sends the write data to the Flash memory 120, and the write data in the SRAM is backed up into the DRAM simultaneously. That is, while the controller 110 of the solid state drive 100 sends the write data in the SRAM to the Flash memory 120, the write data is backed up into the DRAM outside the controller 110.

Step S301 of this embodiment is exactly the same as step S201 of the second embodiment, and steps S303-S306 of this embodiment are exactly the same as steps S204-S207 of the second embodiment and steps S103-S106 of the first embodiment, and the same steps will be no longer repeated here.

Then, in this embodiment, in step S302, the controller reads the write data in the first cache unit and sends the write data to the Flash memory, and backs up the write data from the first cache unit to the second cache unit. The central processing unit 114 sends the first instruction to the first cache unit 115, the cache controller 113 and the Flash controller 112, reads the write data in the first cache unit 115 and sends it to the Flash memory 120, and also backs it up to the second cache unit 130 simultaneously, and then releases the cache space of the SRAM.

As shown in FIG. 5b, in this embodiment, after the controller 110 receives the write data from the host 200 and stores the write data in the first cache unit 115, the write data needs to be simultaneously transmitted from the first cache unit 115 (SRAM) to the Flash memory 120 and the second cache unit 130 (DRAM). Therefore, the data transmission consistency of the second transport unit 352 (FDMA) at the interface of the Flash memory 120 needs to be adjusted. Specifically, the first transport unit 351 (HDMA) transports the write data of the host 200 to the first cache unit 115, and then reads the write data from the SRAM, and the second transport unit 352 (FDMA) receives the write data of the first cache unit 115 through one input channel L32, and then transmits the write data to the second cache unit 130 and the Flash memory 120 through two output channels. As shown in FIG. 5b, the first output channel L33 transports data to the Flash memory 120, and the second output channel L34 simultaneously transports data to the DRAM. The FDMA is the same as the FDMA in the embodiment of FIG. 3b, but one output channel is added. The two output channels of the FDMA must process data in synchronization, otherwise the speed of writing data into Flash memory may be reduced. Due to a periodic self-refresh operation of the DRAM, a cache is generally set on the second output channel L34 to balance the inconsistency of the pace of writing data to the Flash memory 120 and writing data to the DRAM. Such a design will increase the design complexity at the interface of the Flash memory to a certain extent. Therefore, compared with the second embodiment, the design complexity of this embodiment is relatively improved, so this embodiment is suitable for scenarios which is not easy to increase design complexity at the host interface, but is easier to increase design complexity at the Flash memory interface.

In the above three embodiments, the write data is stored in the SRAM and backed up to the DRAM simultaneously, so as to ensure the safety, reliability and integrity of data transmission, effectively avoid data loss, and at the same time make the DRAM meet the bandwidth requirements. Moreover, in the above-mentioned embodiments, the execution speeds of the write operation methods of the first embodiment and the third embodiment are similar, and both are slightly faster than that of the second embodiment; the design complexity of the second embodiment is the simplest. The solid state drives and the write operation methods thereof according to the three embodiments of the present disclosure have their own characteristics, and different types of the solid state drives can be selected according to actual requirements.

To sum up, according to the solid state hard disk and the write operation method provided by the embodiments of the present disclosure, before or at the time of sending the write data in the first cache unit to the Flash memory, the write data is firstly backed up to the second cache unit, so that when an operation to write the write data from the first cache unit into the Flash memory fails, the backup data of the second cache unit can continue to be called, so as to ensure success rate of storage and complete rate of the write data, and improve storage accuracy. The SRAM serving as the first cache unit is mainly responsible for writing and reading the write data, and the high bandwidth of the SRAM solves the problem that the DRAM cannot read and write data quickly due to its low bandwidth; and the DRAM serving as the second cache unit is used to store the backup data of the write data, mainly perform the write operation of the write data, and start the read operation only when the Flash memory fails to cache. The high capacity of the DRAM is used to solve the problem of failing to store the writing data in the Flash memory as the SRAM cannot store the write data for a long time due to its small capacity. By combining advantages of both of the first cache unit and the second cache unit simultaneously, the efficiency and quality of write operations are improved, and the bandwidth requirements are also lowered.

The embodiments in accordance with the present disclosure, as described above, are not described in detail, and are not intended to limit the present invention to be only the described particular embodiments. Obviously, many modifications and variations are possible in light of the above. These embodiments have been chosen and described in detail by the specification to explain the principles and embodiments of the present disclosure so that those skilled in the art can make good use of the present invention and the modified use based on the present invention. The invention is to be limited only by the scope of the appended claims and the appended claims and equivalents thereof.

What is claimed is:

1. A solid state drive, comprising:
    a controller, which is coupled with a host, configured to receive write data from outside, and comprises a first cache unit for storing the write data and a direct memory access;
    a flash memory, which is coupled with the controller and configured to receive the write data sent by the first cache unit according to a first instruction of the controller;
    a second cache unit, which is coupled with the controller, configured to receive and store the write data as backup data and send the backup data to the flash memory according to a second instruction of the controller, wherein the second instruction is obtained after the write data fails to be written into the flash memory under the first instruction,
    wherein through the direct memory access, the write data is stored in the first cache unit and the second cache unit simultaneously, wherein the direct memory access has a first output channel corresponding to the first cache unit and a second output channel corresponding to the second cache unit, and a cache is set on the second output channel.

2. The solid state drive according to claim 1, wherein the controller further comprises:
    a central processing unit, which is coupled with the first cache unit, and configured to control storing and releasing operations of the write data in the first cache unit;
    an interface unit, which is coupled with the central processing unit and the host, and configured to receive the write data and realize data transmission;
    a flash controller, which is coupled with the central processing unit and the flash memory, and configured to control writing operation of the write data into the flash memory; and
    a cache controller, which is coupled with the central processing unit and the second cache unit, and configured to realize storing and releasing operations of the write data in the second cache unit according to a control of the central processing unit.

3. The solid state drive according to claim 2, wherein the central processing unit is configured to:
    control the first cache unit to store the write data, and transmit the first instruction to the first cache unit and the flash controller; and
    release a cache space of the first cache unit after a transmission of the write data to the flash memory under the first instruction is completed.

4. The solid state drive according to claim 3, wherein after the write data fails to be written into the flash memory under the first instruction, the central processing unit is configured to transmit the second instruction to the cache controller and the flash controller.

5. The solid state drive according to claim 1, wherein the first cache unit is a static random access memory, and the second cache unit is a dynamic random access memory.

6. A write operation method for a solid state drive comprising a controller, a flash memory and a second cache unit, wherein the controller comprises a first cache unit, and the controller performs following operations:
    receiving write data from a host;
    through direct memory access, storing the write data in the first cache unit and the second cache unit simultaneously, wherein the direct memory access has a first output channel corresponding to the first cache unit and a second output channel corresponding to the second cache unit, and a cache is set on the second output channel;
    reading the write data in the first cache unit and sending the write data to the flash memory;

releasing a cache space occupied by the write data in the first cache after the transmission of the write data is completed;

after receiving a feedback indicating that the write data fails to be written into the flash memory, repeating the step of reading the write data from the second cache unit and sending the write data to the flash memory until a feedback indicating that the write data is successfully written into the flash memory is received; and releasing a cache space occupied by the write data in the second cache unit.

7. The write operation method according to claim 6, wherein receiving the feedback indicating that the write data fails to be written into the flash memory comprises: receiving a write failure status signal fed back in the flash memory.

8. The write operation method of claim 6, wherein receiving the feedback indicating that the write data fails to be written into the flash memory comprises: detecting that the write data in the flash memory does not completely match the write data of the host.

\* \* \* \* \*